UNITED STATES PATENT OFFICE.

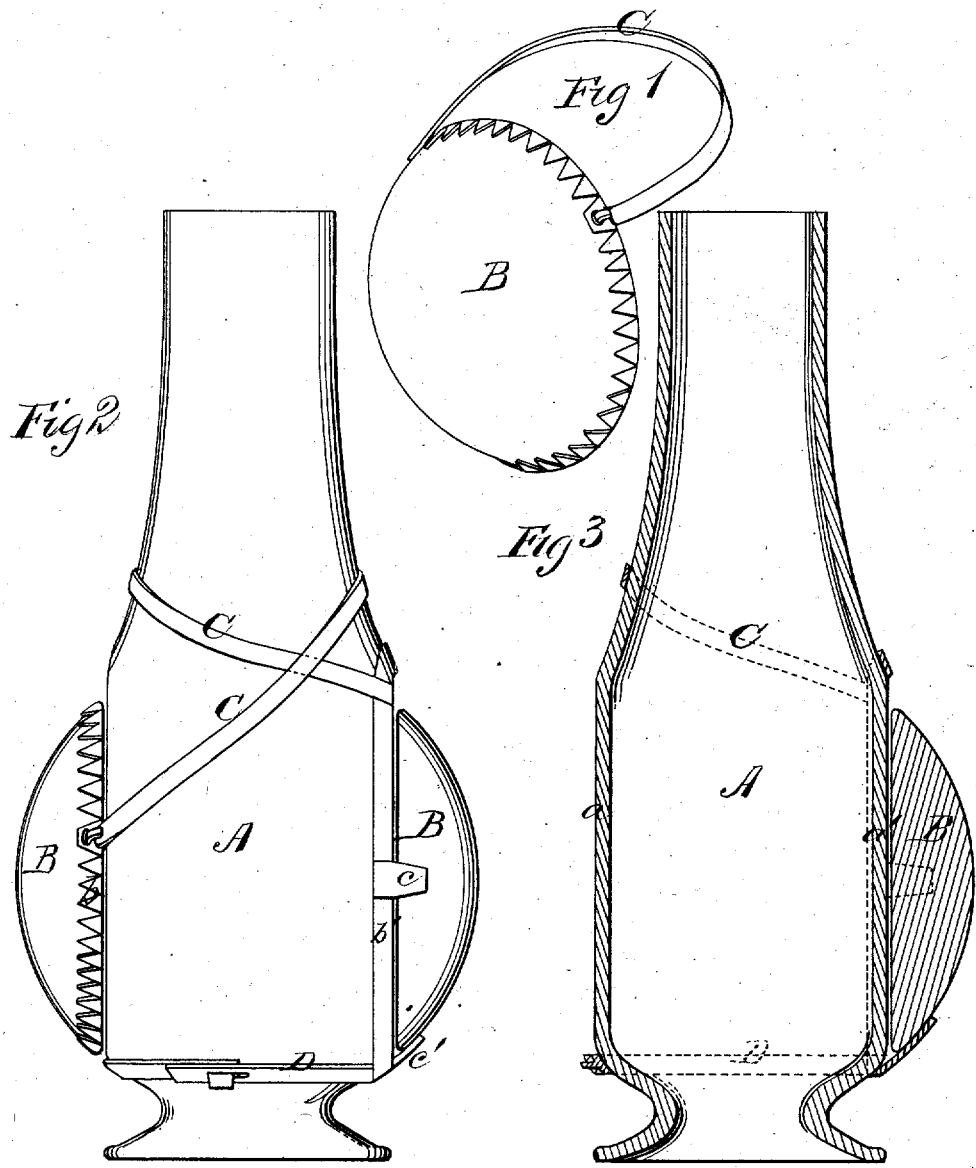

GEORGE W. MARTIN, OF CHELSEA, MASSACHUSETTS.

IMPROVEMENT IN LENS ATTACHMENTS FOR LAMP-CHIMNEYS.

Specification forming part of Letters Patent No. 193,013, dated July 10, 1877; application filed June 16, 1877.

*To all whom it may concern:*

Be it known that I, GEORGE W. MARTIN, of Chelsea, in the county of Suffolk and State of Massachusetts, have invented a new and valuable Improvement in Lamp-Chimneys and Lens Attachments; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a perspective view of the lens and its suspending-collar. Fig. 2 is a side view of the lamp with the lenses applied, and Fig. 3 is a vertical central section of the chimney and lens.

This invention has relation to improvements in means for securing reflecting-lenses to lamp-chimneys and other flame-protectors.

The object of my invention is to devise a quick and economical mode for securing reflecting-lenses to the outside of lamp-chimneys and other flame-protectors, and for concentrating the rays of light in a strong, vivid ray.

To this end the nature of the invention consists in combining, with a lamp-chimney having one or more plane surfaces, a detachable plano-convex lens, applied, by means of suitable attachments, to the chimney, with its plane surface in contact with that of the chimney, whereby the lens is approached as nearly as possible to the flame, and a strongly-concentrated stream of light is produced.

It also consists in combining, with a lamp-chimney or flame-protector having a flat surface or surfaces, a lens or lenses arranged in a frame, and suspended by a collar-strap from the chimney, with its plane surface in contact with that of the said chimney, whereby a ready and economical mode of removably attaching the lens to the same is attained.

It also consists in combining, with a lamp-chimney or flame-protector having one or more flattened surfaces, one or more lenses, suspended therefrom, and a retaining or holding strap, embracing the neck of the said chimney below the swell or globe, whereby means are provided for holding the lens in contact with the chimney, as will be hereinafter more fully set forth.

In the accompanying drawings, the letter A designates a lamp-chimney, having two opposite plane surfaces, $a$ $a'$, of sufficient dimensions, which may be parallel to each other or at an angle to each other, according to circumstances. These faces will be parallel when the light is to be thrown in both directions in a straight line, and oblique when the lamp is at a corner, and is intended to light both ways, as at a corner of a street, corridor, or tunnel. Where the lamp reflects only in one direction, as in ships' lights, I shall employ one flat surface only.

B designates a plano-convex lens of a diameter proportionate to that of the plane surface of the lamp-chimney. This lens is provided with a marginal frame, $b$, consisting of a body and a number of holding-lugs, that are bent down upon the lens after it is inserted into the body of the frame. To this frame is rigidly secured, in any suitable manner, without soldering, a metallic collar-strap, C, that passes over the chimney, above the globular part or swell thereof, and conforms to the shape of that part of said chimney which it embraces, which, being oval, prevents the collar from swinging from side to side. The lens in this position lies with its plane surface snugly in contact with the corresponding flat surface of the chimney, to which it will cling from its own weight when the lamp is at rest.

This construction will obtain when the lamp is upon a fixed immovable base, as on a lamp-post, in buildings, and the like.

When the lens is not needed it may be lifted off the chimney and laid aside. The latter may be then used for ordinary illumination.

When the chimney and lens are used in signaling, or on shipboard, or on any movable base, a second strap, D, buckled or otherwise removably secured around the neck of the chimney, will be used to prevent the lens or lenses from swinging out from the chimney.

The metallic strap-collars C D and the frame $b$ may be struck out in a single piece with a die; or they may be formed of suitable wire. In any event they will not fit so tightly upon their respective parts of the chimney as to be in danger of breaking when the said chimney becomes heated.

Instead of permanently fastening the lens in its frame, as aforesaid, I sometimes render it detachable therefrom, as follows: The rim $b'$ is provided with lateral projections or lugs $c$ and a bottom lug, $c'$. The lens is passed under and between the lugs $c$, and slipped into place, as shown in Fig. 2, until its edge rests upon lugs $c'$. The lens, in this construction, is slightly oval, preferably, so that by giving it a slight turn it will obtain bearings on the lugs, and be held steady. The lens being in close contact with the flat surface of the chimney, it is approximated, as near as possible, to the flame, and a strongly-concentrated stream of light is thrown out. The lenses are, as it were, harnessed to the chimney by the fastenings C D.

What I claim as new, and desire to secure by Letters Patent, is—

1. The combination, with a chimney or flame-protector having a plane surface or surfaces, of a plano-convex lens, applied on said chimney or flame-protector with its plane surface in contact with that of the chimney or flame-protector, substantially as specified.

2. The combination, with a lamp-chimney having the flattened or plane surfaces $a$ upon its globular part, of the plano-convex lens or lenses B, removably secured with their plane surfaces in contact with those of the chimney, substantially as specified.

3. The combination, with the lamp-chimney having plane surfaces $a$, of the lenses B, having collars C, adapted to be passed over the funnel of the chimney, and to sustain the lenses with their plane surfaces in contact with those of the chimney, substantially as specified.

4. The combination, with the lamp-chimney A, having a flat surface or surfaces, $a$, and a plano-convex lens or lenses suspended thereon, of the collar-strap D, substantially as specified.

In testimony that I claim the above I have hereunto subscribed my name in the presence of two witnesses.

GEORGE W. MARTIN.

Witnesses:
EDGAR F. PARCHER,
ALLEN PRATT.